(12) United States Patent
Teller et al.

(10) Patent No.: US 11,270,173 B2
(45) Date of Patent: Mar. 8, 2022

(54) ESTABLISH ACCESS TO A SERVICE USING MACHINE-READABLE CODE

(71) Applicant: Microsoft Technology Licensing, LLC, Redmond, WA (US)

(72) Inventors: Rachel Anne Brown Teller, Seattle, WA (US); Kristina K. Hotz, Seattle, WA (US); Tarek B. Kamel, Issaquah, WA (US); Neelam Anuradha Reddy, Seattle, WA (US); Peter M. Tsang, Bellevue, WA (US); James Shang Kai Chou, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 152 days.

(21) Appl. No.: 16/839,996

(22) Filed: Apr. 3, 2020

(65) Prior Publication Data
US 2021/0312251 A1 Oct. 7, 2021

(51) Int. Cl.
*G06K 19/06* (2006.01)
*H04L 67/146* (2022.01)
*H04L 29/06* (2006.01)

(52) U.S. Cl.
CPC ... *G06K 19/06046* (2013.01); *G06K 19/06028* (2013.01); *G06K 19/06037* (2013.01); *H04L 63/0807* (2013.01); *H04L 63/0876* (2013.01); *H04L 67/146* (2013.01)

(58) Field of Classification Search
CPC ....... G06K 19/06046; G06K 19/06028; G06K 19/06037; H04L 67/146

USPC ............................................ 235/494, 462.13
See application file for complete search history.

(56) References Cited

U.S. PATENT DOCUMENTS

| | | | | |
|---|---|---|---|---|
| 2013/0152176 A1* | 6/2013 | Courtney | ............ | H04L 63/0853 726/5 |
| 2013/0219479 A1* | 8/2013 | DeSoto | .............. | G06Q 20/3276 726/6 |
| 2013/0237155 A1* | 9/2013 | Kim | ...................... | H04W 76/10 455/41.2 |

(Continued)

OTHER PUBLICATIONS

Garg, Gautam, "WhatsApp Web QR Code: How to Start Using WhatsApp Web", Retrieved From: https://scanova.io/blog/blog/2015/03/05/whatsapp-qr-code/, Mar. 5, 2015, 13 Pages.

*Primary Examiner* — Paultep Savusdiphol
(74) *Attorney, Agent, or Firm* — Mannava & Kang, P.C.

(57) ABSTRACT

According to examples, an apparatus may include a processor that may receive a request from a first device for an authentication token for access to a service, determine whether the first device is authorized to receive the authentication token for access to the service, and based on a determination that the first device is authorized to receive the authentication token for access to the service, generate a machine-readable code including the authentication token that a second device is to use for access to the service by the second device. The processor may also send the generated machine-readable code to the first device. The first device may display the machine-readable code and the second device may use a captured image of the machine-readable code to establish an authenticated session to the service on the second device.

20 Claims, 7 Drawing Sheets

(56) References Cited

U.S. PATENT DOCUMENTS

| | | | | |
|---|---|---|---|---|
| 2014/0282961 A1* | 9/2014 | Dorfman | ............ | H04L 63/0861 |
| | | | | 726/7 |
| 2015/0089613 A1* | 3/2015 | Tippett | ............... | H04L 63/0853 |
| | | | | 726/7 |
| 2018/0124599 A1* | 5/2018 | Werner | .............. | H04L 63/0853 |
| 2020/0092272 A1* | 3/2020 | Eisen | ................... | G06Q 20/385 |

* cited by examiner

\# ESTABLISH ACCESS TO A SERVICE USING MACHINE-READABLE CODE

BACKGROUND

Client devices may often communicate with servers over a network to access services provided by the servers. Prior to communicating with the client devices, the servers may authenticate the client devices to, for instance, prevent an unauthenticated client device from accessing services provided by the servers. For instance, the servers may implement an authentication scheme in which the users of the client devices may provide credentials each time the client devices seek to establish access to the services. The servers may enable the client devices to establish an authenticated session to the services in response to the credentials being determined to be authentic. The credentials may be user names, passwords, one-time access codes, or other types of information that may be unique to a user or a log in attempt.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

As discussed above, client devices may often provide credentials, e.g., user credentials, each time the client devices seek authenticated access to a service. This may require that a user input their credentials into each of the client devices that the user intends to use to access a service. As this may be an inconvenience, users may limit the number of client devices that the users may use to access the service, which may reduce a total number of downloads of applications through which the service may be accessed.

Disclosed herein are systems, apparatuses, methods, and computer-readable media in which a processor may generate and send a machine-readable code that may include an authentication token that a second device may use to access a service. That is, for instance, the second device may use the authentication token included in the generated machine-readable code to be authenticated and to use the authenticated status to establish access to the service without the second device or a user of the second device submitting an additional credential to be authenticated.

As disclosed herein, a first device may submit a request for a machine-readable code including an authentication token that a second device may use to be authenticated and access a service. A user may instruct the first device to submit the request such that a service that may currently be accessed on the first device may also or instead be accessed on the second device. That is, a user may intend for the second device to establish access to the service and such access may be established through use of the authentication token included in the machine-readable code and without re-entry by the user of the user's credentials into the second device.

As also disclosed herein, in response to receipt of the request, a processor, e.g., of a authentication server, may determine whether the first device is authorized to receive the authentication token. The processor may, based on a determination that the first device is authorized to receive the authentication token, generate a machine-readable code including the authentication token and send the generated machine-readable code to the first device. The first device may display the machine-readable code and the second device may capture an image of the machine-readable code, may identify the authentication token included in the machine-readable code, and may send the authentication token to the processor. The processor may, in response to the authentication token being authenticated, send a session token to the second device, which the second device may use to establish a session to the service.

Through implementation of various features of the present disclosure, a processor may generate and send a machine-readable code including an authentication token to a first device and may use the authentication token received from a second device in authenticating the second device. Thus, for instance, the processor may authenticate the second device without requiring that a user of the first device and the second device re-enter the user's credentials into the second device. As users may often forget or incorrectly enter their user credentials, users may enter their user credentials multiple times prior to entering the correct credentials. In addition, as authentication schemes utilize multi-factor authentication in which, for instance, one-time codes are generated and sent to the user's devices. Both of these instances may result in processing resources on the user devices as well as the servers that generate the one-time codes to be consumed. A technological improvement achievable through implementation of the features of the present disclosure may be a reduction in the processing resources consumed on the user devices and the servers as entry of the user's credentials as well as the generation of one-time codes may be obviated through implementation of the features of the present disclosure.

Figure 1:
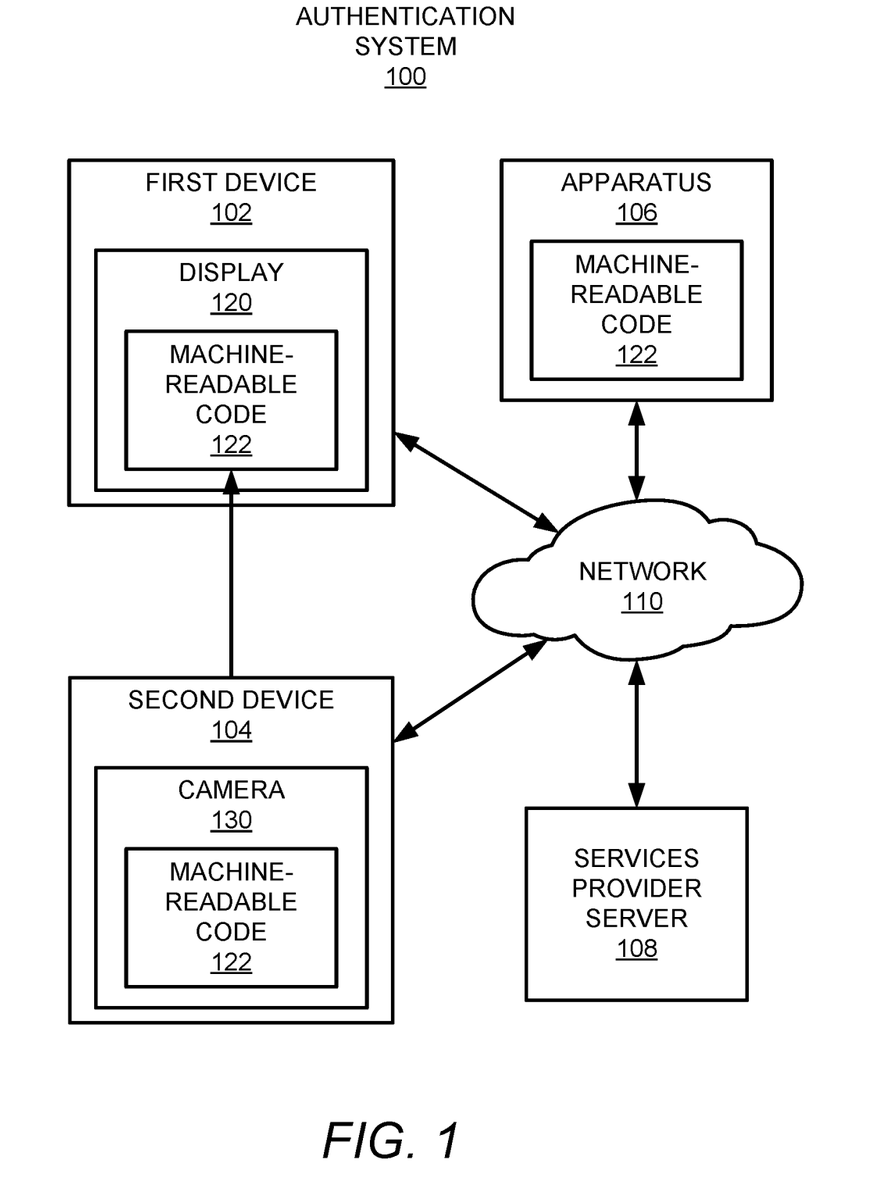
FIG. 1 shows a block diagram of an authentication system in accordance with an embodiment of the present disclosure.
Figure 2:
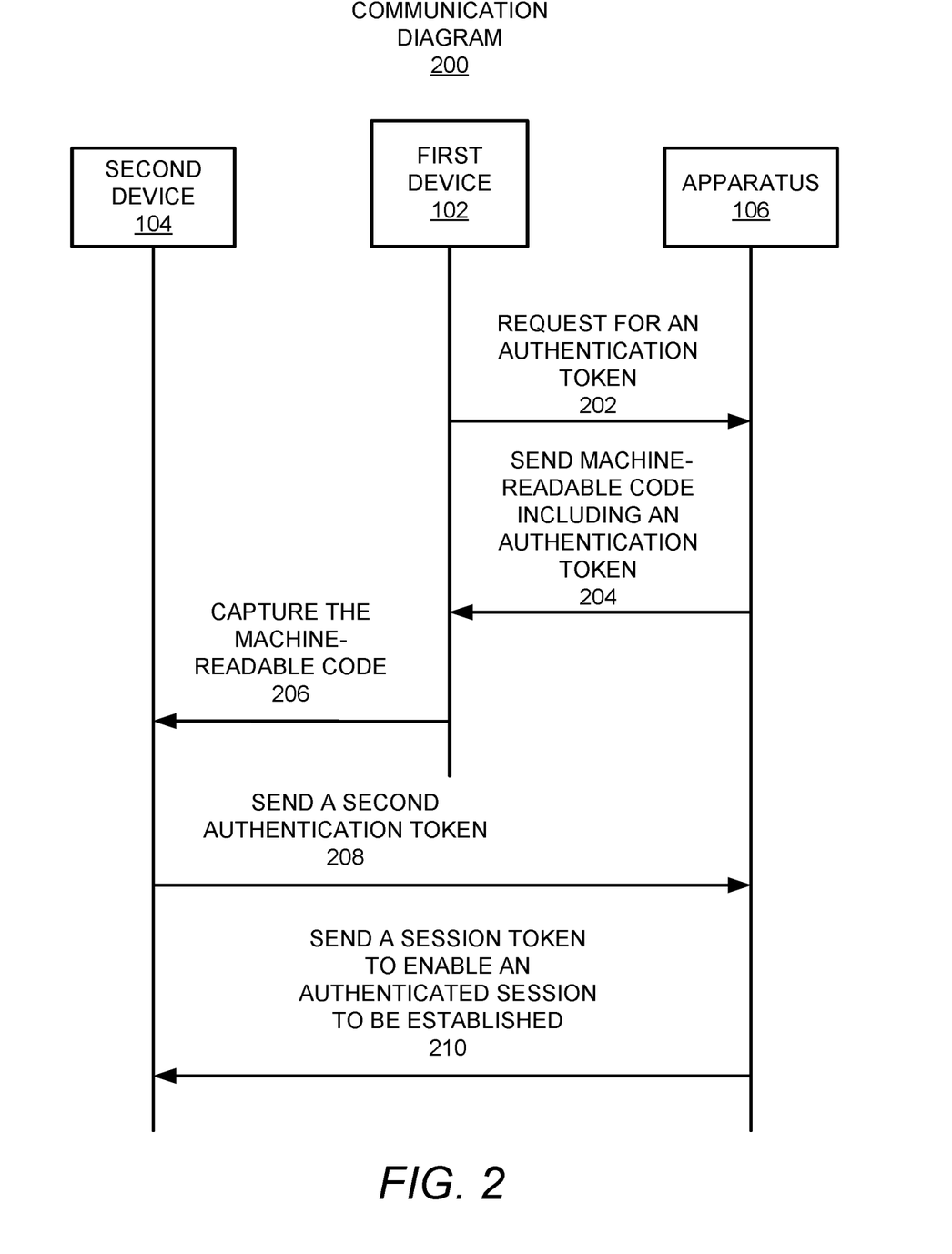
FIG. 2 shows a communication diagram for the authentication system depicted in FIG. 1, in accordance with an embodiment of the present disclosure.

Reference is first made to FIGS. 1 and 2. FIG. 1 shows a block diagram of an authentication system 100 in accordance with an embodiment of the present disclosure. FIG. 2 shows a communication diagram 200 for the authentication system 100 depicted in FIG. 1, in accordance with an embodiment of the present disclosure. It should be understood that the authentication system 100 and the communication diagram 200 of the authentication system 100 may include additional features and that some of the features described herein may be removed and/or modified without departing from the scopes of the authentication system 100 and/or the communication diagram 200 of the authentication system 100.

As shown in FIG. 1, the authentication system 100 may include a first device 102, a second device 104, an apparatus 106, and a services provider server 108. According to examples, the first device 102 and the second device 104 may each be a computing device, such as a personal computer, a laptop computer, a tablet computer, a smartphone, or the like. In a particular example, the first device 102 may be a first type of computing device, such as a laptop computer, and the second device 104 may be a second type of computing device, such as a tablet computer or a smartphone. The apparatus 106 may also be a computing device, such as an authentication server, that may provide authentication services to the first device 102 and the second device 104 for access to a service.

The services provider server 108 may provide services to the first device 102 and/or the second device 104 following authentication of the first device 102 and/or the second device 104 by the apparatus 106. In some examples, the apparatus 106 may also perform the functions of the services provider server 108. In any regard, the service may be a web-based service such as a web-site, an application, and/or the like.

As also shown in FIG. 1, the first device 102 and the second device 104 may communicate with the apparatus 106 and the services provider server 108 through a network 110. The network 110 may be any suitable type of network such as the Internet, a wide area network, a local area network, or the like.

With reference to FIGS. 1 and 2, the first device 102 may send a request 202 for an authentication token for access to a service, e.g., a service that the services provider server 108 may provide. As discussed herein, the first device 102 may send the request 202 for the authentication token for access to the service as part of an authentication process of the second device 104, in which the second device 104 may use the authentication token to be authenticated without requiring that the second device 104 or the user provide credentials again to be authenticated.

According to examples, the first device 102 may send the request 202 for the authentication token in response to an input by a user of the first device 102 that a second device 104 is to access the service. Particularly, for instance, the user may have previously submitted credentials to the apparatus 106 through the first device 102 and the apparatus 106 may have authenticated the user based on the submitted credentials. This may include authentication using multi-factor authentication, e.g., use of both passwords and one-time codes. In addition, in response to the user being authenticated, the apparatus 106 may have provided a session token to the first device 102 that the first device 102 may have used to establish access to the service from the services provider server 108.

While the first device 102 has an active authenticated session to the service, the user may instruct the first device 102 to request the authentication token such that the second device 104 may use the authentication token to establish an authenticated session to the service on the second device 104. That is, for instance, the user of the first device 102 may intend to transfer a current session to the service from the first device 102 to the second device 104 or to establish a new session on the second device 104. By way of particular example, the first device 102 may be a laptop computer and the second device 104 may be a smartphone and the user may intend to transfer the current session or to establish a new session on the second device 104 such that the user may access the service while the user is mobile.

In some examples, as the user is accessing the service on the first device 102, the service or another application may cause an option for the user to download the application to access the service on the second device 104 to be displayed on a display 120 of the first device 102. The user may select to download the application on the second device 104 and the application may be downloaded and/or installed on the second device 104. In these examples, the option for the user to download the application may automatically be displayed on the display 120 of the first device 102 to, for instance, increase usage of the application on the second device 104. In other examples, the application may have previously been installed on the second device 104 and the user may intend to continue a current session on the first device 102 on the second device 104.

In response to receipt of the request 202 for the authentication token from the first device 102, the apparatus 106 may determine whether the first device 102 is authorized to receive the authentication token for access to the service. For instance, the apparatus 106 may identify a credential associated with the first device 102. As discussed herein, the first device 102 may have submitted the credential, e.g., user identifier, a password, a one-time code, and/or the like, when the first device 102 earlier sought authorization to access the service. The apparatus 106 may thus access the previously submitted credential (or multiple credentials in instances in which a multi-factor authentication process was implemented to authenticate the first device 102) of or associated with the first device 102. In addition, the apparatus 106 may determine whether the credential(s) is/are authentic and, based on a determination that the credential(s) is/are authentic, determine that the first device 102 is authorized to receive the authentication token. As another example, the apparatus 106 may determine whether the first device 102 has a currently active authenticated session to the service and, based on a determination that the first device 102 has a currently active authenticated session to the service and thus is authenticated, determine that the first device 102 is authorized to receive the authentication token. However, based on a determination that the first device is not authorized to receive the authentication token, not generate the machine-readable code including the authentication token.

Based on a determination that the first device 102 is authorized to receive the authentication token for access to the service, the apparatus 106 may generate a machine-readable code 122 including the authentication token for access to the service by the second device 104. The machine-readable code 122 may be a visually displayable code, for instance, a bar code, a quick response code, or the like, in which the authentication token may be encoded into the machine-readable code 122. The authentication token may include, for instance, information corresponding to the credential or credentials used by the first device 102 to be authenticated by the apparatus 106. In addition, the apparatus 106 may send the generated machine-readable code 122 to the first device 102.

In response to receipt of the machine-readable code 122, the first device 102 may display the machine-readable code 122 on the display 120 of or connected to the first device 102. In addition, the user may capture 206 an image of the machine-readable code 122 using a camera 130 of or connected to the second device 104. The second device 104 may also send 208 a second authentication token to the apparatus 106, in which the second authentication token may be equivalent to the authentication token included in the captured machine-readable code 122. The second authentication token may, however, be a different token, for instance, as may occur when the second device 104 captured an improper machine-readable code, a malicious actor provided the second device 104 with an improper machine-readable code, and/or the like.

In response to receipt of the second authentication token from the second device 104, the apparatus 106 may determine whether the second authentication token is authentic. Based on a determination that the second authentication token is authentic, the apparatus 106 may permit the second device 104 to establish an authenticated session to the service. That is, for instance, the apparatus 106 may determine whether the second authentication token matches the authentication token included in the machine-readable code 122 sent to the first device 102. In addition, the apparatus 106 may determine that the second authentication token is authentic based on a determination that the second authentication token matches the authentication token. In response to a determination that the second authentication token is authentic, the apparatus 106 may send 210 a session token that may enable the second device 104 to establish an authenticated session to the session. Alternatively, however, based on a determination that the second authentication token is not authentic, the apparatus 106 may prevent the second device 104 from establishing an authenticated session to the service.

In response to receipt of the session token, the second device 104 may send the session token to the services provider server 108 and based on receipt of the session token, the services provider server 108 may establish an authenticated session between the second device 104 and the service. As such, for instance, the second device 104 may automatically establish the authenticated session without requiring that the second device 104 submit the user's credentials to the apparatus 106, which may result in steps being required to be performed on the second device 104. The use of fewer steps may result in the second device 104 consuming fewer computational resources and network resources in establishing access to the service.

According to examples, the apparatus 106 may include an authentication session identifier in the generated machine-readable code 122. The authentication session identifier may identify a state of the session that is currently active on the first device 102. In these examples, the second device 104 may send the authentication session identifier to the services provider server 108. In addition, the services provider server 108 may cause the second device 104 to access the service, in which the state of the session that is currently active on the first device 102 may be established on the second device 104.

Figure 3:
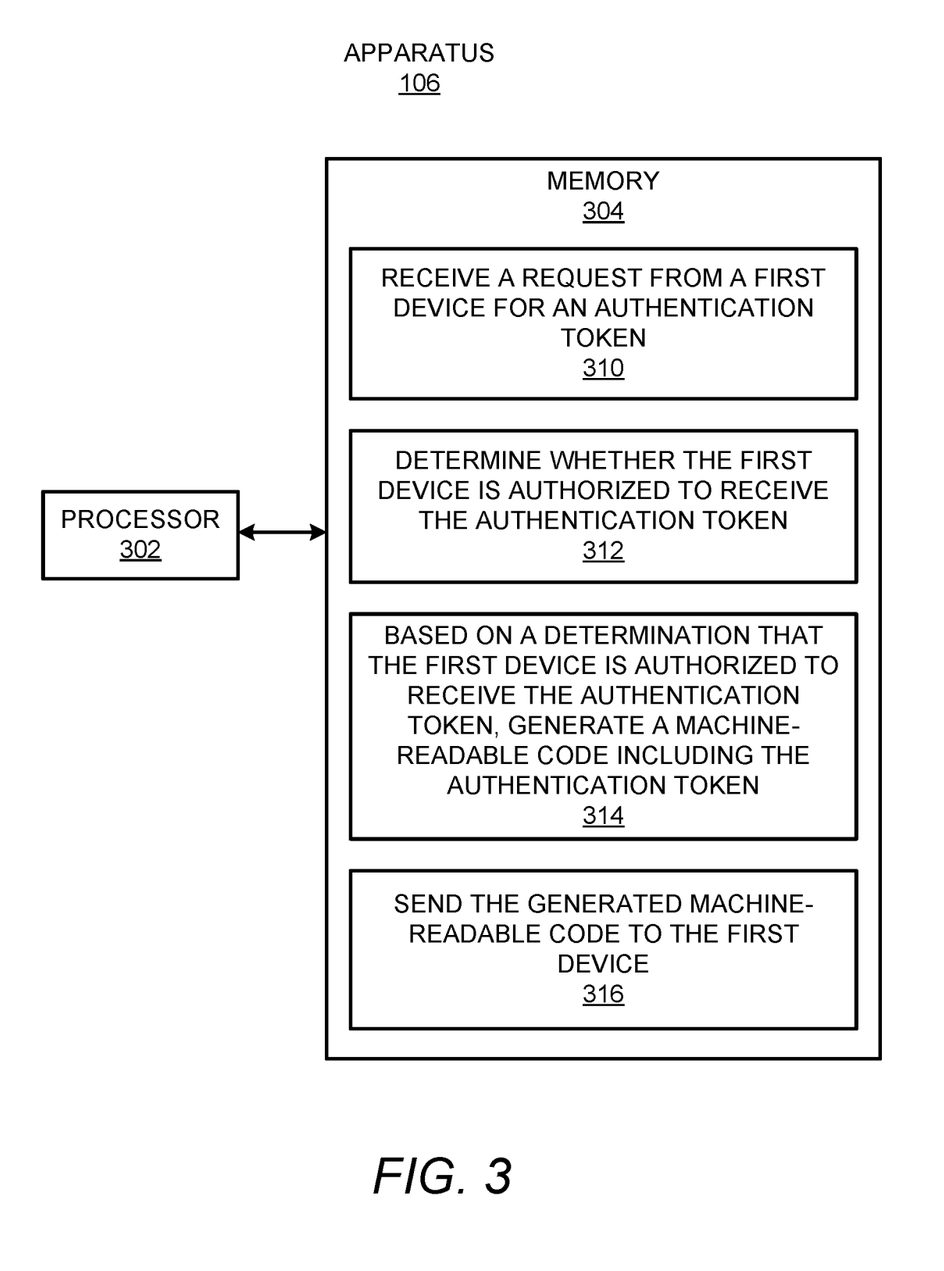
FIG. 3 depicts a block diagram of the apparatus depicted in FIGS. 1 and 2, in accordance with an embodiment of the present disclosure.

Turning now to FIG. 3, the apparatus 106 depicted in FIGS. 1 and 2 is shown in greater detail, in accordance with an embodiment of the present disclosure. As shown in FIG. 3, the apparatus 106 may include a processor 302 that may control operations of the apparatus 106 and a memory 304 on which data that the processor 302 may access and/or may execute may be stored. The processor 302 may be a semiconductor-based microprocessor, a central processing unit (CPU), an application specific integrated circuit (ASIC), a field-programmable gate array (FPGA), and/or other hardware device. The memory 304, which may also be termed a computer readable medium, may be, for example, a Random Access memory (RAM), an Electrically Erasable Programmable Read-Only Memory (EEPROM), a storage device, or the like. The memory 304 may be a non-transitory computer readable storage medium, where the term "non-transitory" does not encompass transitory propagating signals. In any regard, the memory 304 may have stored thereon machine-readable instructions that the processor 302 may execute.

Although the apparatus 106 is depicted as having a single processor 302, it should be understood that the apparatus 106 may include additional processors and/or cores without departing from a scope of the apparatus 106. In this regard, references to a single processor 302 as well as to a single memory 304 may be understood to additionally or alternatively pertain to multiple processors 302 and multiple memories 304. In addition, or alternatively, the processor 302 and the memory 304 may be integrated into a single component, e.g., an integrated circuit on which both the processor 302 and the memory 304 may be provided.

As shown in FIG. 3, the memory 304 may have stored thereon machine-readable instructions 310-316 that the processor 302 may execute. Although the instructions 310-316 are described herein as being stored on the memory 304 and may thus include a set of machine-readable instructions, the apparatus 106 may include hardware logic blocks that may perform functions similar to the instructions 310-316. For instance, the processor 302 may include hardware components that may execute the instructions 310-316. In other examples, the apparatus 106 may include a combination of instructions and hardware logic blocks to implement or execute functions corresponding to the instructions 310-316. In any of these examples, the processor 302 may implement the hardware logic blocks and/or execute the instructions 310-316. As discussed herein, the apparatus 106 may also include additional instructions and/or hardware logic blocks such that the processor 302 may execute operations in addition to or in place of those discussed above with respect to FIG. 3.

The processor 302 may execute the instructions 310 to receive a request from a first device 102 for an authentication token for access to a service. As discussed herein, the first device 102 may submit the request to receive the authentication token, which the second device 104 may use to receive approval to access the service without separately submitting credentials used by the first device 102 to access the service. The processor 302 may execute the instructions 312 to determine whether the first device 102 is authorized to receive the authentication token for access to the service. The processor 302 may execute the instructions 314 to, based on a determination that the first device 102 is authorized to receive the authentication token for access to the service, generate a machine-readable code 122 including the authentication token for access to the service by a second device 104. In addition, the processor 302 may execute the instructions 316 to send the generated machine-readable code 122 to the first device 102, in which the first device 102 may display the machine-readable code 122. In addition, the second device 104 may use a captured image of the machine-readable code 122 to establish an authenticated session to the service on the second device 104.

Figure 4:
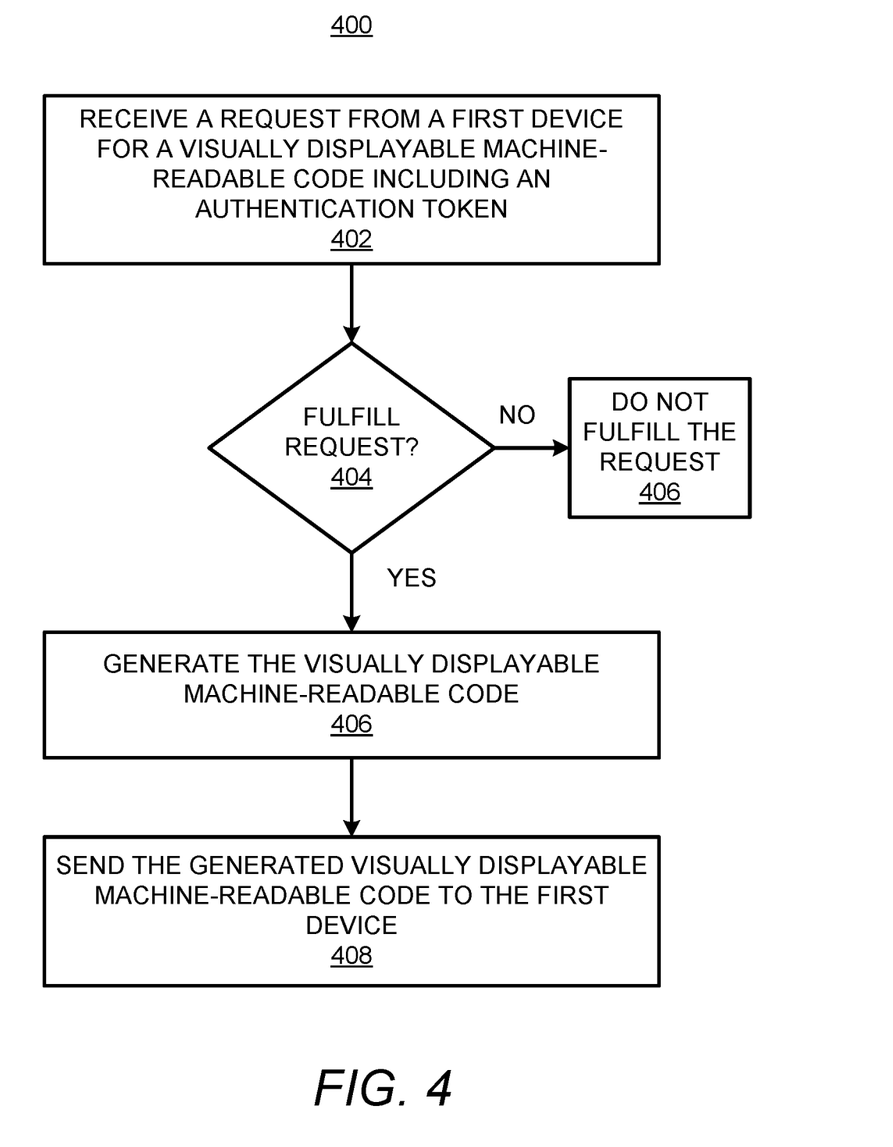
FIGS. 4, 5A, and 5B, respectively, depict flow diagrams of methods for generating a visually displayable machine-readable code including an authentication token for use in establishing an authenticated session to a service in accordance with an embodiment of the present disclosure.
Figure 5A:
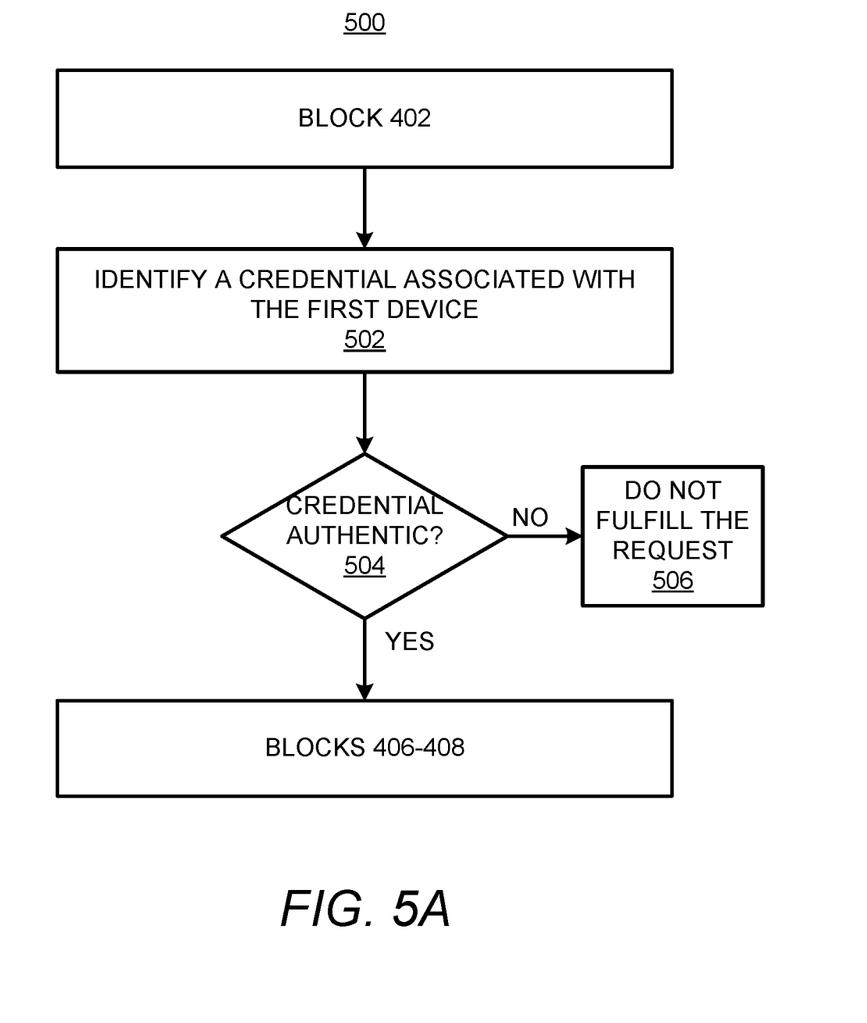
Figure 5B:
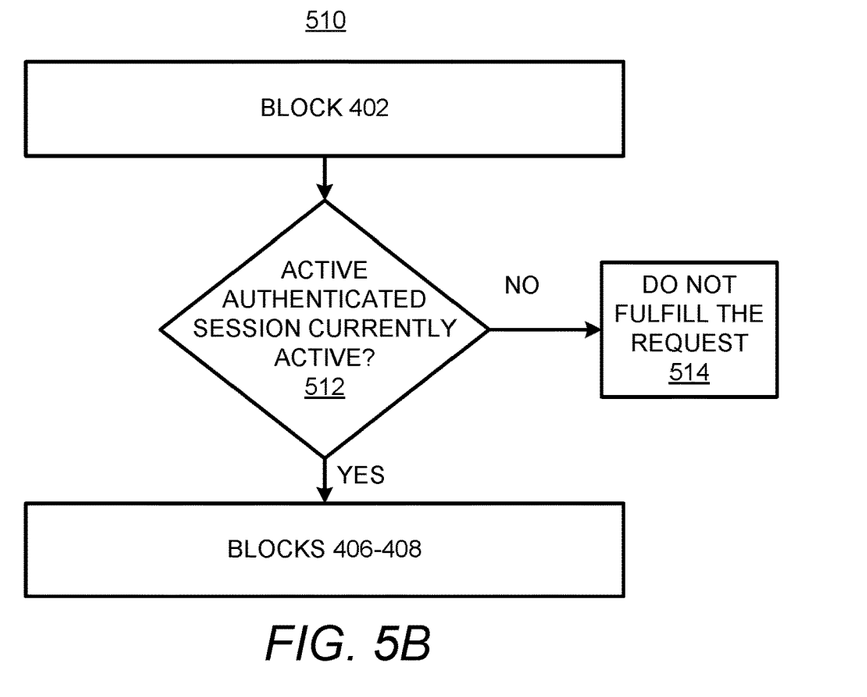
Figure 6:
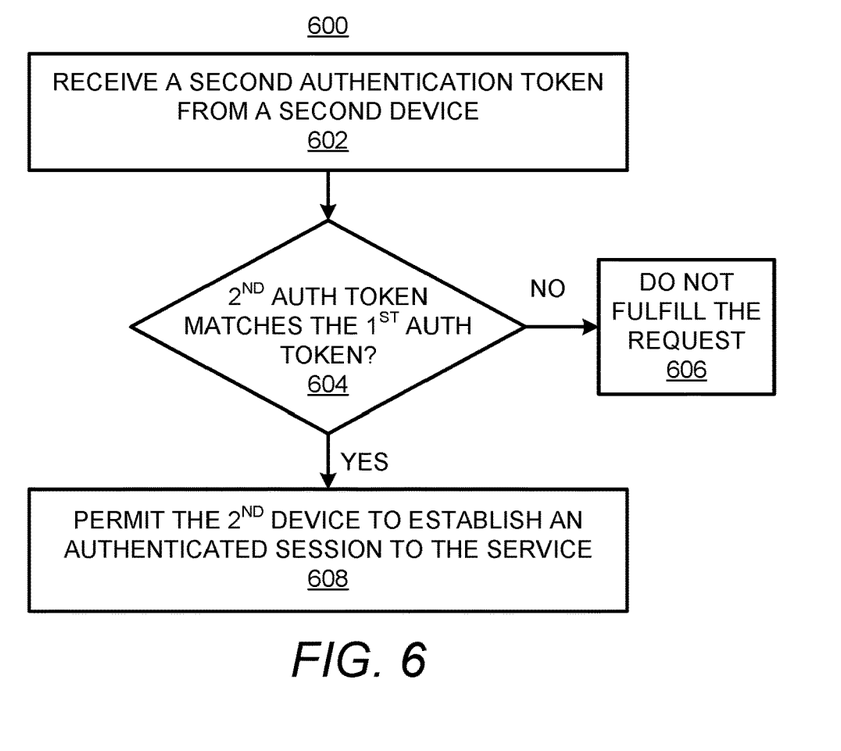
FIG. 6 depicts a flow diagram of a method for permitting a second device to establish an authenticated session to the service in accordance with an embodiment of the present disclosure.

Various manners in which the processor 302 of the apparatus 106 may operate are discussed in greater detail with respect to the methods 400-600 depicted in FIGS. 4-6. Particularly, FIGS. 4, 5A, and 5B, respectively, depict flow diagrams of methods 400, 500, and 510 for generating a visually displayable machine-readable code including an authentication token for use in establishing an authenticated session to a service in accordance with an embodiment of the present disclosure. In addition, FIG. 6 depicts a flow diagram of a method 600 for permitting a second device 104 to establish an authenticated session to the service in accordance with an embodiment of the present disclosure. It should be understood that the methods 400-600 respectively depicted in FIGS. 4-6 may include additional operations and that some of the operations described therein may be removed and/or modified without departing from the scopes of the methods 400-600. The descriptions of the methods 400-600 are made with reference to the features depicted in FIGS. 1-3 for purposes of illustration.

With reference first to FIG. 4, at block 402, the processor 302 may receive a request from a first device 102 for a visually displayable machine-readable code 122 including an authentication token that a second device 104 may use to access a service. At block 404, the processor 302 may determine whether the request is to be fulfilled. Examples of manners in which the processor 302 may make this determination are described with respect to FIGS. 5A and 5B herein.

At block 406, based on a determination that the first device 102 is not authorized to receive the authentication token, the processor 302 may not generate the machine-readable code 122. However, at block 408, based on a determination that the request is to be fulfilled, the processor 302 may generate the visually displayable machine-readable code 122 including the authentication token. In addition, at block 410, the processor 302 may send the generated visually displayable machine-readable code 122 to the first device 102. As discussed herein, the first device 102 may display the visually displayable machine-readable code 122 and a second device 104 is to capture an image of and use the captured image of the visually displayable machine-readable code 122 displayed by the first device 102 to automatically establish an authenticated session to the service on the second device 104. That is, the second device 104 may establish the authenticated session to the service on the second device 104 using the authentication code included in the visually displayable machine-readable code 122 without submitting user credentials of the user to the apparatus 106.

Turning now to FIG. 5A, the processor 302 may execute block 402 to receive a request from a first device 102. In addition, to determine whether to fulfill the request at block 404, the processor 302 may, at block 502, identify a credential associated with the first device 102. The credential associated with the first device 102 may be a credential that the user may have previously submitted to the apparatus 106 through the first device 102, which the apparatus 106 may have used to authenticate the user. In some examples, the credential may be a user identifier, a password, a one-time code, and/or the like.

Based on a determination that the credential is not authentic, the processor 302 may, at block 506, not fulfill the request for the visually displayable machine-readable code 122. However, based on a determination that the credential is authentic, the processor 302 may execute blocks 406-408 to generate and send the visually displayable machine-readable code 122 to the first device 102.

With reference to FIG. 5B, the processor 302 may execute block 402 to receive a request from a first device 102. In addition, to determine whether to fulfill the request at block 404 (FIG. 4), the processor 302 may, at block 512, determine whether the first device 102 has a currently active authenticated session to the service. Based on a determination that the first device 102 does not have an active authenticated session, the processor 302 may, at block 514, not fulfill the request for the visually displayable machine-readable code 122. However, based on a determination that the first device 102 has an active authenticated session, the processor 302 may execute blocks 406-408 to generate and send the visually displayable machine-readable code 122 to the first device 102.

Turning now to FIG. 6, at block 602, the processor 302 may receive a second authentication token from the second device 104. At block 604, the processor 302 may determine whether the second authentication token matches the authentication token included in the visually displayable machine-readable code 122 sent to the first device 102. Based on a determination that the second authentication token does not match the authentication token included in the visually displayable machine-readable code 122, the processor 302 may, at block 606, not permit the second device 104 to establish an authenticated session to the service. However, based on a determination that the second authentication token matches the authentication token, the processor 302 may, at block 608, permit the second device 104 to establish an active authenticated session to the service. That is, the processor 302 may send a session token for the service to enable the second device 104 to establish an authenticated session to the service. In addition, the second device 104 may use the session token to establish access to the service from the services provider server 108.

Some or all of the operations set forth in the methods 400-600 may be included as utilities, programs, or subprograms, in any desired computer accessible medium. In addition, the methods 400-600 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 7:
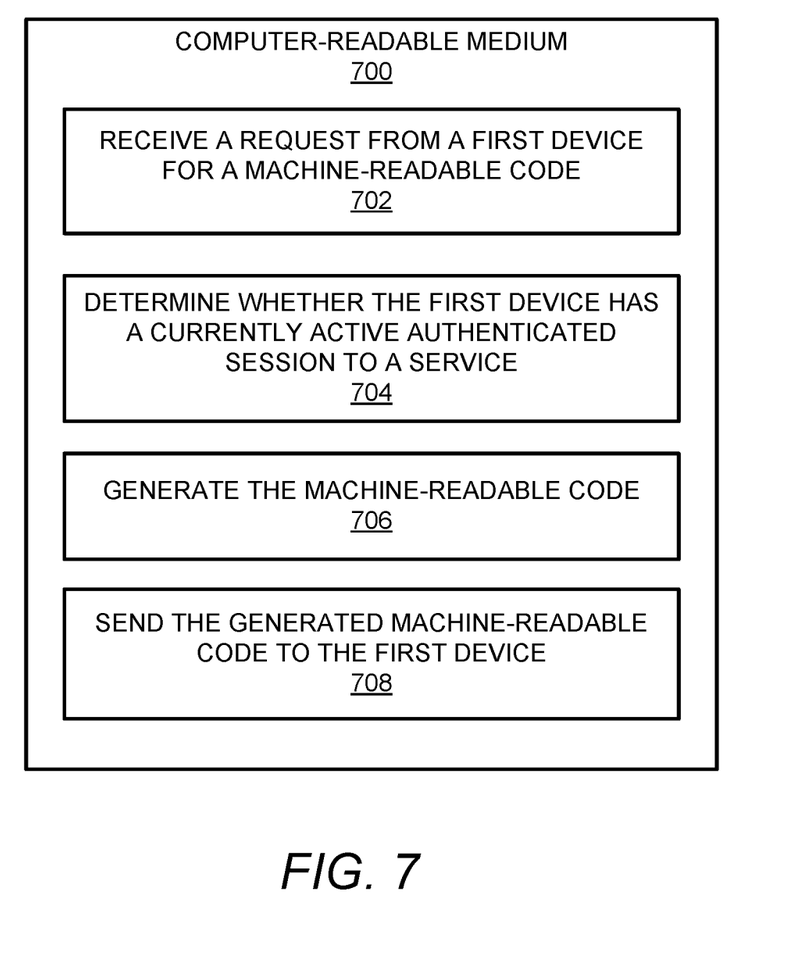
FIG. 7 depicts a block diagram of a computer-readable medium that may have stored thereon computer-readable instructions for generating and sending machine-readable code including an authentication token that a second device may use to access a service, in accordance with an embodiment of the present disclosure.

Turning now to FIG. 7, there is shown a block diagram of a computer-readable medium 700 that may have stored thereon computer-readable instructions for generating and sending machine-readable code 122 including an authentication token that a second device 104 may use to access a service in accordance with an embodiment of the present disclosure. It should be understood that the computer-readable medium 700 depicted in FIG. 7 may include additional instructions and that some of the instructions described herein may be removed and/or modified without departing from the scope of the computer-readable medium 700 disclosed herein. The computer-readable medium 700 may be a non-transitory computer-readable medium, in which the term "non-transitory" does not encompass transitory propagating signals.

The computer-readable medium 700 may have stored thereon computer-readable instructions 702-708 that a processor, such as the processor 302 depicted in FIG. 3, may execute. The computer-readable medium 700 may be an electronic, magnetic, optical, or other physical storage device that contains or stores executable instructions. The computer-readable medium 700 may be, for example, Random Access memory (RAM), an Electrically Erasable Programmable Read-Only Memory (EEPROM), a storage device, an optical disc, and the like.

The processor may fetch, decode, and execute the instructions 702 to receive a request from a first device 102 for a machine-readable code 122, in which the machine-readable code 122 may include an authentication token for use by a second device 104 to access a service. The processor may fetch, decode, and execute the instructions 704 to determine whether the first device 104 has a currently active authenticated session to the service. The processor may fetch, decode, and execute the instructions 706 to, based on a determination that the first device 102 has a currently active authenticated session to the service, generate the machine-readable code 122 including the authentication token as a code that may be displayed on the first device 102. The processor may fetch, decode, and execute the instructions 702 to send the generated machine-readable code 122 to the first device 102. As discussed herein, the first device 102 may display the machine-readable code 122 and a second device 104 may capture an image of and use the captured image of the machine-readable code 122 displayed by the first device 102 to establish an authenticated session to the service on the second device 104 without submission of a credential from the second device 104 separate from the authentication token in the machine-readable code 122.

The processor may also fetch, decode, and execute instructions to receive a second authentication token from the second device 104, to determine whether the second authentication token matches the authentication token included in the machine-readable code 122 sent to the first device 102, and, based on a determination that the second authentication token matches the authentication token, permit the second device 104 to establish an active authenticated session to the service. The processor may further fetch, decode, and execute instructions to generate the machine-readable code 122 including the authentication token as one of a displayable barcode, a quick response code, or the like. The processor may further fetch, decode, and execute instructions to include an authentication session identifier of the currently active authenticated session of the first device 102 in the machine-readable code 122.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine readable instructions that cause the processor to:
receive a request from a first device for an authentication token for access to a service;
determine whether the first device is authorized to receive the authentication token for access to the service;
based on a determination that the first device is authorized to receive the authentication token for access to the service, generate a machine-readable code including the authentication token that a second device is to use for access to the service by the second device; and
send the generated machine-readable code to the first device, the first device to display the machine-readable code, wherein the second device is to use a captured image of the machine-readable code to establish an authenticated session to the service on the second device.

2. The apparatus of claim 1, wherein the instructions cause the processor to:
based on a determination that the first device is not authorized to receive the authentication token, not generate the machine-readable code.

3. The apparatus of claim 1, wherein the instructions cause the processor to:
identify a credential associated with the first device;
determine whether the credential is authentic; and
based on a determination that the credential is authentic, determine that the first device is authorized to receive the authentication token.

4. The apparatus of claim 1, wherein the instructions cause the processor to:
determine whether the first device has a currently active authenticated session to the service; and
based on a determination that the first device has a currently active authenticated session to the service, determine that the first device is authorized to receive the authentication token.

5. The apparatus of claim 1, wherein the instructions cause the processor to:
generate the machine-readable code as visually displayable code.

6. The apparatus of claim 1, wherein the instructions cause the processor to:
receive a second authentication token from the second device;
determine whether the second authentication token is authentic; and
based on a determination that the second authentication token is authentic, permit the second device to establish an authenticated session to the service.

7. The apparatus of claim 6, wherein the instructions cause the processor to:
based on a determination that the second authentication token is not authentic, prevent the second device from establishing an authenticated session to the service.

8. The apparatus of claim 6, wherein the instructions cause the processor to:
determine whether the second authentication token matches the authentication token included in the machine-readable code sent to the first device; and determine that the second authentication token is authentic based on a determination that the second authentication token matches the authentication token.

9. The apparatus of claim 1, wherein the instructions cause the processor to:
include an authentication session identifier in the machine-readable code.

10. A method comprising:
receiving, by a processor, a request from a first device for a visually displayable machine-readable code including an authentication token for access by a second device to a service;
determining, by the processor, whether the request is to be fulfilled;
based on a determination that the request is to be fulfilled, generating, by the processor, the visually displayable machine-readable code including the authentication token; and
sending, by the processor, the generated visually displayable machine-readable code to the first device, wherein the first device is to display the visually displayable machine-readable code and a second device is to capture an image of and use the captured image of the visually displayable machine-readable code displayed by the first device to automatically establish an authenticated session to the service on the second device.

11. The method of claim 10, further comprising:
identifying a credential associated with the first device;
determining whether the credential is authentic; and
based on a determination that the credential is authentic, determining that the request is to be fulfilled.

12. The method of claim 10, further comprising:
determining whether the first device has a currently active authenticated session to the service; and
based on a determination that the first device has a currently active authenticated session to the service, determining that the request is to be fulfilled.

13. The method of claim 10, further comprising:
receiving a second authentication token from the second device;
determining whether the second authentication token matches the authentication token included in the machine-readable code sent to the first device; and
based on a determination that the second authentication token matches the authentication token, permitting the second device to establish an authenticated session to the service.

14. The method of claim 13, further comprising:
based on a determination that the second authentication token does not match the authentication token, preventing the second device from establishing the authenticated session to the service.

15. The method of claim 10, further comprising:
including an authentication session identifier in the visually displayable machine-readable code.

16. A computer-readable medium on which is stored computer-readable instructions that when executed by a processor, cause the processor to:
receive a request from a first device for a machine-readable code, the machine-readable code including an authentication token for use by a second device to access a service;
determine whether the first device has a currently active authenticated session to the service;
based on a determination that the first device has a currently active authenticated session to the service, generate the machine-readable code including the authentication token as a displayable code on the first device; and
send the generated machine-readable code to the first device, wherein the first device is to display the machine-readable code and a second device is to capture an image of and use the captured image of the machine-readable code displayed by the first device to establish an authenticated session to the service on the second device without submission of a credential from the second device separate from the authentication token in the machine-readable code.

17. The computer-readable medium of claim 16, wherein the instructions are further to cause the processor to:
receive a second authentication token from the second device;
determine whether the second authentication token matches the authentication token included in the machine-readable code sent to the first device; and
based on a determination that the second authentication token matches the authentication token, permit the second device to establish an active authenticated session to the service.

18. The computer-readable medium of claim 17, wherein the instructions are further to cause the processor to:
based on a determination that the second authentication token does not match the authentication token, prevent the second device from establishing an authenticated session to the service.

19. The computer-readable medium of claim 16, wherein the instructions are further to cause the processor to:
generate the machine-readable code including the authentication token as a one of a displayable barcode or a quick response code.

20. The computer-readable medium of claim 16, wherein the instructions are further to cause the processor to:
include an authentication session identifier of the currently active authenticated session of the first device in the machine-readable code.

* * * * *